(12) United States Patent
Schäfer et al.

(10) Patent No.: US 8,759,471 B2
(45) Date of Patent: Jun. 24, 2014

(54) ADHESION-PROMOTING SYSTEM FOR RUBBER GOODS

(75) Inventors: Ralph Schäfer, Wiesbaden (DE); Peter Ziegler, Mainz-Kostheim (DE)

(73) Assignee: Allnex Germany GmbH, Wiesbaden (DE)

( * ) Notice: Subject to any disclaimer, the term of this patent is extended or adjusted under 35 U.S.C. 154(b) by 246 days.

(21) Appl. No.: 13/321,659

(22) PCT Filed: May 19, 2010

(86) PCT No.: PCT/EP2010/056866
§ 371 (c)(1),
(2), (4) Date: Dec. 30, 2011

(87) PCT Pub. No.: WO2010/133622
PCT Pub. Date: Nov. 25, 2010

(65) Prior Publication Data
US 2012/0095152 A1 Apr. 19, 2012

(30) Foreign Application Priority Data
May 21, 2009 (EP) ..................................... 09160882

(51) Int. Cl.
*C08G 12/20* (2006.01)
(52) U.S. Cl.
USPC ........... 528/162; 528/156; 528/164; 524/509; 524/595; 523/424

(58) Field of Classification Search
USPC ........... 528/156, 162, 164; 523/424; 524/509, 524/524
See application file for complete search history.

(56) References Cited

U.S. PATENT DOCUMENTS

| 4,148,769 A | 4/1979 | Swarts et al. |
| 5,859,169 A * | 1/1999 | Burkhart et al. .............. 528/129 |

FOREIGN PATENT DOCUMENTS

| DE | 20 02 023 A1 | 7/1971 |
| DE | 2414798 A1 | 10/1974 |
| EP | 0 440 036 A1 | 8/1991 |
| EP | 0 473 948 A2 | 3/1992 |
| EP | 0 827 971 A2 | 3/1998 |
| GB | 2350616 A | 12/2000 |
| PL | 136592 | 5/1984 |

* cited by examiner

*Primary Examiner* — Michael L Leonard
(74) *Attorney, Agent, or Firm* — Drinker Biddle & Reath LLP

(57) ABSTRACT

The invention relates a mixture of a urethane-aldehyde resin UA prepared by condensation of an aldehyde A1 and an alkyl urethane U, and of a novolak PA, to a process for the preparation of the said mixture, and a method of use thereof as adhesion promoter in rubber goods.

11 Claims, No Drawings

ADHESION-PROMOTING SYSTEM FOR RUBBER GOODS

CROSS-REFERENCE TO RELATED APPLICATIONS

This application is a national stage application (under 35 U.S.C. §371) of PCT/EP2010/056866, filed May 19, 2010, which claims benefit of European application 09160882.8, filed May 21, 2009.

BACKGROUND OF THE INVENTION

The invention relates to an adhesion-promoting system for rubber goods.

Good adhesion of vulcanised rubber to steel cord and particularly, brass-plated steel cord, as well as synthetical fibre cord made from polyester, rayon, polyamides, aramide fibres, carbon fibres and glass fibres is of decisive importance for the long-term properties of e.g., textile and of steel radial tyres. Most frequently used adhesion promoters are based on so-called resorcinol novolaks (EP 0 440 036 A1) or resorcinol itself (U.S. Pat. No. 4,148,769 A; DE 20 02 023 A1; B2 DE 24 14 798 B2). Pure resorcinol is used only in combination with methylene or formaldehyde donors, such as hexamethylene tetramine ("hexa") or hexamethoxymethyl melamine (HMMM). The resins condensed in this manner contribute to the reinforcing effect and improve the interfacial adhesion while at the same time providing increased rigidity of the rubber blend and improved wear resistance of the tread under a wide range of stress conditions. However, the use of resorcinol alone presents health and environmental protection problems because resorcinol may evaporate under the rubber processing conditions. In contrast to free resorcinol, resorcinol-formaldehyde condensates (resorcinol novolaks) release substantially less vapours and are used in combination with HMMM, although they are less effective for the adhesion than free resorcinol. At the same time, the stress values and especially the Shore A hardness of reinforced rubber blends modified with such resorcinol novolaks are substantially less than those achieved when free resorcinol is used. Furthermore, owing to the strong natural colour, resorcinol/formaldehyde condensates cannot be used in those rubber blends intended for applications in which a pale colour of the vulcanised rubber is required. Moreover, resorcinol based or resorcinol containing adhesion promoters show premature aging particularly under heat and/or higher humidity.

Resorcinol-formaldehyde condensates can be obtained, for example, by condensation of formaldehyde or formaldehyde donors with resorcinol or mixtures of resorcinol and a further phenol.

Resorcinol-free adhesion promoters which are based on functionalised melamine resins (EP 0 473 948 A2) and which have a good adhesion promoting action similar to that of free resorcinol or resorcinol novolaks are also available. However, rubber blends which contain such functionalised melamine resins vulcanise more slowly than those which contain HMMM/resorcinol systems. Resorcinol-free systems based on resins prepared from phenol, alkylcarbamates, and formaldehyde have been described in EP 0 827 971 B1. In these systems, resorcinol is replaced by modified novolaks which are prepared by simultaneous reaction of a polyhydric phenol with an aldehyde and an alkyl urethane in the presence of an acidic catalyst at elevated temperature and contain no interfering amounts of free starting phenol. From the Polish patent application PL 136 592, a carbamate-modified phenolic resin has been known that has a good adhesion to metals and glass. This resin is prepared by simultaneous reaction of phenol and a carbamate (1-hexylurethane) with formaldehyde. These systems have the drawback that residual unreacted urethane remains in the resin which is at least partially liberated when the resin is incorporated into the rubber mixture. This leads to undesired fuming.

BRIEF SUMMARY OF THE INVENTION

It is therefore an object of the invention to provide an adhesion-promoting additive that can be added to rubber mixtures to provide enhanced adhesion of the vulcanised rubber to all kinds of cords, which provides good hardness and high tensile strength to rubber goods equipped with one or more of the cords mentioned supra, and which does not cause evolution of toxic or hazardous or noxious fumes, nor gives rise to occupational health problems.

It has been found that novolaks comprising certain urethane aldehyde resins can be used instead of resorcinol or resorcinol-based resins in vulcanisable rubber mixtures comprising the said cords, and provide the vulcanised rubber with an improved adhesion to fibre cord and metal wire cord.

The invention therefore relates to mixtures of novolaks PA and urethane aldehyde resins UA which act as adhesion promoters in rubber mixtures comprising a fibre cord or metal wire cord.

In a preferred embodiment, additives are provided to enhance the adhesion in rubber goods to fibre cords or metal wire cord, which additives are mixtures of at least one urethane aldehyde resin UA prepared by condensation reaction of an aldehyde A1 with an alkyl urethane U, and of at least one novolak PA prepared by reaction of an aldehyde A2 with a monohydric phenol P1 or a polyhydric phenol Pn or a mixture of mono- and polyhydric phenols P1n.

The invention further relates to a process for the preparation of mixtures of urethane aldehyde resins UA and novolaks PA, wherein the novolak PA is made in the presence of preformed urethane aldehyde resins UA.

A DETAILED DESCRIPTION OF THE INVENTION

The invention also relates to vulcanisable rubber blends containing at least one rubber, at least one cord which may be a fibre cord or a metal wire cord, or both, customary vulcanising agents, curing agents, fillers and customary additives in addition to mixtures of urethane aldehyde resins UA and novolaks PA, and to rubber goods prepared from fibre cord or filaments or metal wire, and rubber blends containing at least one rubber, customary vulcanising agents, curing agents, fillers and customary additives in addition to mixtures of urethane aldehyde resins UA and novolaks PA.

The urethane aldehyde resins UA can be prepared by acid-catalysed reaction of an aldehyde A with an alkyl urethane U, optionally in the presence of a catalyst C. In a preferred embodiment, the aldehyde A is an aliphatic aldehyde having from 1 to 10 carbon atoms. In a further preferred embodiment, the alkyl urethane is a monoalkyl urethane of formula (1)

   (formula (1)), where $R^1$ is an alkyl or alkoxyalkyl radical having from 2 to 20 carbon atoms, or an alkylene bisurethane of formula (2)

   (formula (2)), where $R^2$ is an alkylene or oxaalkylene diradical having from 2 to 12 carbon atoms.

For the preparation of the urethane aldehyde resins UA, the urethanes U are preferably monoalkyl urethanes such as ethyl urethane, butyl urethane, 2-ethylhexyl urethane, and decyl urethane. Alkylene bisurethanes than can preferably be used are ethylene glycol bisurethane, 1,4-butylene bisurethane, and 1,6-hexylene bisurethane. These urethanes may also be used as mixtures.

The aldehydes A1 preferably used for the preparation of the urethane aldehyde resins are aliphatic monoaldehydes which are particularly preferably saturated, having one aldehyde group —CHO, and from 1 to 10 carbon atoms. Preferred aldehydes are formaldehyde, acetaldehyde, and propionic aldehyde, as well butyric and isobutyric aldehydes. It is also possible, but less preferred, to use benzaldehyde, and aldol (beta-hydroxybutyraldehyde), as well as unsaturated aldehydes such as crotonaldehyde. It is also possible to use dialdehydes having from 2 to 10 carbon atoms, such as glyoxal, malonic dialdehyde, as well as succinic and glutaric dialdehydes. Mixtures of the aldehydes mentioned can also be used in a preferred embodiment. In this context, it is particularly preferred to use mixtures of saturated aliphatic monoaldehydes.

For the preparation of novolaks, all phenolic compounds P which have at least one reactive hydrogen atom on the aromatic nucleus and at least one phenolic hydroxyl group and are thus at least monofunctional in their reactivity with aldehydes are suitable for the preparation of the modified novolaks used according to the invention. These include mononuclear or polynuclear phenolic compounds which may be monofunctional, difunctional or trifunctional or have a higher functionality in their reactivity with, for example, formaldehyde. The hydrogen atoms reactive towards aldehydes are those which are in the ortho or para position on an aromatic nucleus relative to a hydroxyl group or another substituent with +I and/or +M effect.

Suitable phenols are mononuclear and polynuclear hydroxy-aromatics which may have one hydroxyl group (monophenols P1) or more than one hydroxyl group (polyphenols Pn), and which are optionally substituted by linear, branched or cyclic alkyl groups having from 1 to 20 carbon atoms, by oxyalkyl groups or halogen atoms, at least one reactive hydrogen atom being bonded to one of the aromatic nuclei. These phenols can be used individually or as a mixture. Phenol itself, the various cresol and xylenol isomers, the isomers of ethylphenol, of propylphenol or of isopropylphenol and p- or o-substituted alkylphenols having up to 18, in particular up to 15, carbon atoms in the side chain are preferably used. It is also possible to use phenols substituted by olefinically unsaturated groups, such as, for example, o- or p-vinylphenol or p-isopropenylphenol, and phenolic substances reacted with dicyclopentadiene (DCPD) and/or styrene and/or colophony.

Polynuclear monohydric phenols, such as the isomeric hydroxynaphthalenes, which may optionally be substituted as described above, and mononuclear polyhydric phenols, such as pyrocatechol, resorcinol, hydroquinone, pyrogallol and phloroglucinol, are also suitable.

It is also possible to use polynuclear polyhydric phenols such as, for example, isomers of diphenylolmethane, diphenylolethane, diphenylolpropane (bisphenol A) and bishydroxyaryl compounds in which the aromatic structures are linked by a direct bond or an ethenyl, ether, carbonyl, sulphonyl, carbonyloxy or carboxamido group, such as dihydroxybiphenyl, dihydroxystilbene, dihydroxydiphenyl ether, dihydroxybenzophenone, dihydroxydiphenyl sulphone, dihydroxyphenyl benzoate and dihydroxybenzanilide, which are optionally substituted by alkyl or alkoxy groups or halogen atoms as described above. Other polyhydric polynuclear phenols, such as, for example, the isomeric dihydroxynaphthalenes and also trihydric and polyhydric hydroxyaromatics may also be used.

Suitable aldehydes A2 used in the synthesis of novolaks PA may be selected from the same compounds as listed under A1, where it is, of course, possible to combine urethane aldehyde resins UA with novolaks PA where different, or the same aldehydes, or mixtures of aldehydes are used.

Substantially linear urethane aldehyde UA resins can be synthesised from preformed urethanes U (preferably alkyl or alkoxy alkyl esters of carbamic acid) and aldehydes A1, wherein the ratio of amounts of substance of urethane NH groups to the amount of substance of aldehyde groups is preferably from 3 mol: 1 mol to 1 mol: 1 mol, particularly preferably from 2.2:1 to 1.5:1. This stoichiometry allows to control the degree of polymerisation by providing monomeric structures having an average of two reactive sites per molecule, leading to chain formation.

The composition of the novolaks used in this invention as a component of the adhesion promoters can be varied within a wide range. The ratio of the amounts of substance of their components phenol P to aldehyde A2 is from 1 mol: 0.3 mol to 1 mol: 0.95 mol, in particular 1 mol: 0.5 mol to 1 mol:0.9 mol.

Preferably used resins are those which are present in solid, finely divided form under normal conditions. The melting point should be at least so high that the products do not cake during storage at room temperature and during transportation.

The novolaks PA used in this invention contain mass fractions of less than 1.0%, preferably less than 0.5%, particularly preferably less than 0.2%, of free phenols of component P, based on the mass of the novolaks PA.

For the preparation of the novolaks according to the invention, natural or synthetic unsubstituted hydrocarbons or their derivatives H having 4 to 40 carbon atoms and having one or more carbon-carbon double bonds, in the latter case also having conjugated double bonds, may also be used in the condensation of the phenolic compounds P with aldehydes A2. Inter alia, unsaturated fatty acids, the fatty oils derived therefrom, fatty amides and fatty alcohols may be used. Suitable starting compounds are furthermore terpene-based unsaturated natural substances, for example colophony. Hydrocarbon compounds which may be used are alkenes, dienes or even more highly ethylenically unsaturated aliphatic and aromatic hydrocarbons. For example, vinylaromatics, in particular styrene, are particularly suitable. The mass fraction of these hydrocarbons H is from 2% to 40%, preferably from 5% to 25%, based on the mass of the novolak modified in this manner.

The novolaks according to the invention can be prepared using acidic catalysts, both by the conventional process (cf., e.g. DE 22 54 379 B2) and by the so-called circulation process (U.S. Pat. No. 5,089,589 A). Preferably used acidic catalysts are strong mineral acids and/or their acidic derivatives, in particular sulphuric acid, hydrogen sulphates, in particular of alkali metals or ammonium, half-esters of sulphuric acid with aliphatic alcohols having 1 to 20 carbon atoms, phosphoric acid, hydrochloric acid or organic acids, such as alkanesulphonic and arylsulphonic acids having 1 to 20 carbon atoms, in particular p-toluenesulphonic acid, and the aliphatic monobasic and dibasic carboxylic acids having 1 to 20 carbon atoms, such as chloroacetic acid, trifluoroacetic acid and in particular oxalic acid dihydrate. Lewis acids, such as aluminium trichloride, zinc chloride and tin chloride and boron trifluoride and its etherates, are also suitable.

The mass ratio of UA and PA is governed by the crosslinking behaviour of the mixture, while it may range from 90 g:10 g to 10 g:90 g. A preferred range is from 10 g:90 g to 35 g:65 g, particularly preferred from 15 g to 85 g:30 g: 70 g. These resins may be mixed, either as solids, preferably as powders, or in the case of liquid or waxy urethane aldehyde resins, preferably in the melt where finely divided phenolic resins PA are homogeneously distributed in the waxy or liquid urethane aldehyde resin. A conventional kneader or internal mixer may be used, particularly if one or both resins are viscous liquids. A preferred method to provide such mixture is to synthesise the phenolic resin in the presence of preformed urethane aldehyde resin, UA. Liquid resins and liquid mixtures of these resins may also be adsorbed on solid carriers such as finely divided silica, which improves the ease of handling, and does not constitute a disadvantage as silica is a common ingredient in rubber mixtures.

The adhesion promoters according to the invention can be used in all known vulcanisable rubber blends.

In a preferred embodiment, the novolak PA is prepared by reaction of an aldehyde A2 with a phenolic compound P which is a monohydric phenol P1 or a polyhydric phenol Pn or a mixture of mono- and polyhydric phenols P1n, in the presence of a urethane-aldehyde resin UA. It has been found that this method of synthesis greatly improves the compatibility between these resins, and facilitates processing.

Vulcanisable rubber blends according to the invention contain at least one rubber, reinforcing agents which are reinforcing fibre cords or filaments or metal wire cords, vulcanising agents, curing agents, fillers and additives and a mixture of a urethane aldehyde resin UA and a novolak PA.

Vulcanisable rubber blends with improved compatibility and processability contain at least one rubber, reinforcing agents which are reinforcing fibre cords or filaments or metal wire cords, vulcanising agents, curing agents, fillers and additives and a mixture of a urethane aldehyde resin UA and a novolak PA, wherein the novolak PA is prepared by reaction of an aldehyde A2 with a phenolic compound P which is a monohydric phenol P1 or a polyhydric phenol Pn or a mixture of mono- and polyhydric phenols P1n, in the presence of a urethane-aldehyde resin UA.

Suitable rubber types which can be vulcanised with sulphur are, for example, preferably natural rubber, polyisoprene, polybutadiene, styrene/butadiene rubber, acrylonitrile rubber, butyl rubber, ethylene/propylene/diene terpolymer rubber (EPDM rubber) or their mixtures, as usually used in the vehicle tyre industry or for the production of industrial rubber goods. The further conventional components may be, for example, fillers, such as carbon black, silica, chalk or kaolin, and inorganic or organic pigments, such as titanium dioxide, iron oxide or phthalocyanine dyes. Further conventional components are, for example, vulcanising agents from the group consisting of sulphur and sulphur donors and vulcanisation auxiliaries, such as, for example, accelerators and activators. It is also customary to use additives, for example from the group consisting of stearic acid, zinc oxide, antiaging agents, tackifiers and also metal compounds for additionally improving the adhesion of rubber to steel cord, for example salts of cobalt or of nickel with monobasic carboxylic acid, preferably naphthenic acids or iso-octanoic acid. Processability can further be improved by addition of mineral oils which are the so-called extender oils, and plasticisers, for example, phthalic esters.

The adhesion promoters according to the invention are used in vulcanisable rubber blends which can be prepared in the usual manner, for example in internal mixers or on mixing rolls. It may be advantageous to increase the mixing temperature during any desired mixing phase to a value above the melting range of the added adhesion promoter resin, for better distribution of the adhesion promoters according to the invention. It is also important that curing agents be incorporated as far as possible only at the end of the mixing process at temperatures which are not too high (80° C. to 100° C.), in order to avoid a premature reaction with the crosslinkable resin components.

In addition, the choice of components and the establishment of their mass fractions in the vulcanisable rubber blends may be based on known criteria. Mixing of the components at higher temperatures can also be carried out in a known manner, for example at 100° C. to 160° C., inter alia, for example, in conventional heatable internal mixers or on conventional heatable mixing rolls. Vulcanisation of the rubber blends, too, can be carried out in a known manner at conventional temperatures in conventional heatable equipment, optionally also under pressure.

The mass fraction of the adhesion promoters according to the invention in the vulcanisable rubber blends may be preferably up to 20%, in particular up to 15%, particularly preferably from 0.5% to 10%, based on the mass of the vulcanisable rubber blend.

The vulcanisable rubber blends which contain the adhesion promoters according to the invention and can be prepared, processed and vulcanised by known methods are very suitable for the production of industrial rubber articles, preferably of those which contain reinforcing agents based on steel cord or textile fibre cord. They can be used in particular for the production of tubes, drive belts, seals, conveyor belts and vehicle tyres, since they have both outstanding adhesion properties with regard to the reinforcing agents mentioned, and hardness and modulus (stiffness) which are surprisingly high compared with vulcanised rubber containing the conventional adhesion promoters.

The invention is described in more detail by the examples below. In these examples, all quantities measured in percent ("%") such as concentrations of solutions ("strength") or compositions of mixtures are mass fractions, calculated as the ratio of the mass of the component under consideration, to the total mass of the solution or mixture, unless stated otherwise.

Example 1

Preparation of a Novolak in the Presence of a Urethane-Aldehyde Resin

A mixture of 1109.5 g of phenol and 115 g of a urethane aldehyde resin (carbamic resin based on butyl urethane and formaldehyde, dynamic viscosity determined in accordance with DIN 53 177 in an Ubbelohde viscosimeter at 23° C.: 8150 mPa·s, Hazen colour according to DIN ISO 6271:80, mass fraction of solids in the resin: 98.5%) were charged in a resin kettle, and heated to 95° C. under stirring. 8.6 g of para-toluene sulphonic acid monohydrate were then added, and 665 g of 37% strength aqueous formaldehyde solution were added during three hours whereafter further 3.2 g of para-toluene sulphonic acid monohydrate were added, and the temperature was raised to reflux temperature and kept for another hour. Water and unreacted formaldehyde were distilled from the reaction mass. 540 g of distillate were collected at a still temperature of up to 115° C. 13.4 g of triethanolamine were then added, and the resulting mixture was heated to 180° C., where distillation was continued. After the mass of distillate had reached 588 g, reduced pressure of 60 hPa (60 mbar) was applied, and the reaction mixture was kept at 180° C. for one further hour. The reduced pressure was released, and 147 g of the reaction mixture were taken from the vessel. Further 92 g of distillate were then collected in continued distillation at 60 hPa, and 100 g of deionised water were slowly added over one hour to strip off the residual phenol. The reaction mixture was held at 180° C. for a further hour and then cooled. 1040 g of resin were isolated.

Example 2

Preparation of a Mixture of a Urethane Aldehyde Resin UA and a Novolak PA

A novolak was prepared from 1300 g of phenol, 130 ml of water, 924 g of 37% strength aqueous formaldehyde solution, and 10 g of the dihydrate of oxalic acid. The mixture was heated to reflux and stirred for 30 minutes, whereafter further 10 g of oxalic acid dihydrate were added, and refluxing was continued for one further hour. 4000 ml of water were then added, and the mixture was allowed to cool. After thirty minutes, the resin had settled, and the upper layer of water was decanted. The residue was heated, and water was distilled off under reduced pressure of 95 hPa until the still had reached a temperature of 120° C. 1400 g of a novolak resin were obtained. 135 g of the urethane aldehyde resin used in Example 1 were added, and well mixed to obtain a homogeneous mixture.

Example 3

Rubber Mixtures

To test the adhesion promoters for their effect in a vulcanisable rubber blend, a base rubber blend 1 was prepared in a kneader at about 140° C. by thorough mixing of the components according to table 1:

TABLE 1

Base Rubber Mixture 1

| Component | mass in g |
| --- | --- |
| Natural Rubber | 1000 |
| Carbon Black | 550 |
| Silica | 150 |
| Zinc Oxide | 60 |
| Stearic Acid | 20 |
| Antioxidant* | 10 |
| Oil** | 40 |

*Antioxidant: ® Vulkanox 4020, supplied by Rheinchemie, N-(1,2-dimethyl butyl)N'-phenyl-p-phenylene diamine
**Oil: Shell Gravex Oil 973, TDAE oil (supplied by Deutsche Shell GmbH, free of polycyclic aromatic compounds)

In each case appropriate amounts of this base rubber mixture 1 were taken and mixed, in a second mixing stage 2, with the adhesion promoter to be tested, after which sulphur, accelerator and curing agent were added as detailed in table 2 in a third mixing stage 3 at temperatures below 100° C., as follows: 183 g of the base rubber mixture 1 were mixed in mixing stage 2 at a temperature of 125° C. with 3 g each of the adhesion promoter resins to be tested: in mixture 3.1, the modified novolak of Example 1 according to the invention was tested against a butyl carbamate modified novolak (in mixture 3.2; Example 1 of EP 0 827 971 B1), and pure resorcinol (in mixture 3.3) as additives.

In the third mixing stage, 186 g each of these mixtures (3.1, 3.2 and 3.3) comprising the base rubber mixture of stage 1 and the adhesion promoter agents were completed by adding to each of these mixtures 4 g of sulphur, 3 g of hexamethoxymethyl melamine, 0.6 g of N-tert. butyl benzothiazole sulfenamide and 0.6 g of N,N-dicyclohexyl-2-benzothiazole-2-sulfenamide, and mixing at a temperature of 90° C.

In table 2, an overview of the experimental findings during the preparation of the mixtures 3.1, 3.2 and 3.3 in mixing stages 2 and 3 is given:

TABLE 2

Mixing Behaviour

| Observation | Mixture 3.1 | Mixture 3.2 | Mixture 3.3 |
| --- | --- | --- | --- |
| Fumes | none | slight | strong |
| Smell of | rubber | rubber | resorcinol |
| Miscibility | good | poor | good |
| Rigidity of Final Mixture | moderate | high | low |

Test specimens (Examples 3.1, 3.2 and 3.3) were made from vulcanised mixtures where steel cord (brass plated, mass fraction of Cu in the brass layer: 63%) was embedded into the rubber mixtures 3.1, 3.2, and 3.3, respectively. On these test specimens, elongation at break and tensile strength at 10%, 25% and 50% elongation were determined according to DIN 53 504. Resistance to tear propagation (DIN 53 125), the force required to tear out the steel cord wires, and the degree of coverage (area of the steel wire surface covered with rubber after pulling out, rated in steps of 10% each) are stated in table 3, and determined after one day of rest after vulcanisation, and after storage for three days at 90° C. and 100% relative humidity.

The results of the steel cord adhesion tests clearly show that tensile strength and adhesion results are even improved compared to the standard resorcinol as adhesion promoter (example 3.3, comparative); it could not have been expected that replacement of the urethane additive to a phenol novolak (example 3.2, comparative) by an in-situ modified novolak comprising a urethane resin admixed in the synthesis of the novolak (example 3.1) would result in both an improvement in miscibility and handling of the unvulcanised rubber mixtures, and also, in the adhesion and strength properties of the cord-reinforced rubber. The urethane aldehyde resin modified novolak also shows the lowest discolouration in the comparative test, this adhesion promoter may therefore also be used for applications where light colours are needed.

TABLE 3

Test Results for Reinforced Vulcanisates

| Test | Unit | Example 3.1 | Example 3.2 | Example 3.3 |
| --- | --- | --- | --- | --- |
| Elongation at Break | % | 333 | 366 | 333 |
| Tensile Strength | | | | |
| at 10% | MPa | 1.9 | 1.5 | 1.5 |
| at 25% | MPa | 2.4 | 2.1 | 2.2 |
| at 50% | MPa | 3.0 | 2.8 | 2.8 |
| Hardness | Shore A | 81 | 78 | 80 |
| Steel Cord Adhesion | | | | |
| after 1 day | N/cm | 362 | 326 | 340 |
| after 3 days | N/cm | 339 | 305 | 281 |
| Cord coverage | | | | |
| after 1 day | % | 80 | 70 | 80 |
| after 3 days | % | 80 | 70 | 60 |

When a simple mixture (Example 2) of a standard novolak and a butyl urethane formaldehyde based resin (that same urethane aldehyde resin used in Example 1) was used instead of the modified novolak of Example 1, added to the rubber mixture in the same amount, it was found that the favourable mixing behaviour of mixture 3.1 was retained, as well as the Shore A hardness and the steel cord adhesion, but apparently due to lack of compatibility, tensile strength, elongation and tear strength of vulcanisates made from rubber comprising this mixture of Example 2 as adhesion promoter were lower than in the case of the modified novolak of Example 1.

The invention claimed is:

1. A mixture of a urethane-aldehyde resin UA prepared by condensation of an aldehyde A1 and an alkyl urethane U, and of a novolak PA prepared by reaction of an aldehyde A2 with a phenolic compound P wherein
   the aldehydes A1 and A2 are independently selected from the group consisiting of formaldehyde, acetaldehyde, propionic aldehyde, butyric aldehyde, and isobutyric aldehyde,
   the alkyl urethane U is selected from the group consisting of ethyl urethane, butyl urethane, 2-ethylhexyl urethane, and decyl urethane,
   the phenolic compound P is selected from the group consisting of phenol, o-, m-, and p-cresol, o-, m-, and p-monoalkylphenols with alkyl radicals up to 18 carbon atoms, and
   the mass ratio of the urethane aldehyde resin UA and the novolak PA is from 90 g:10 g to 10 g:90 g.

2. The mixture of claim 1, wherein the alkyl urethane U is butyl urethane.

3. The mixture of claim 1, wherein the aldehyde A1 used for the preparation of the urethane aldehyde resins UA is formaldehyde.

4. The mixture of claim 1, wherein the phenolic compound P is phenol.

5. The mixture of claim 1, wherein the aldehyde A2 is formaldehyde.

6. The mixture of claim 1, wherein the mass ratio of the urethane aldehyde resin UA and the novolak PA is from 10 g:90 g to 35 g:65 g.

7. A process for the preparation of the mixture of claim 1, wherein the novolak PA is prepared by reaction of an aldehyde A2 selected from the group consisting of formaldehyde, acetaldehyde, propionic aldehyde, butyric aldehyde, and isobutyric aldehyde with a phenolic compound P, selected from the group consisting of phenol, o-, m-, and p-cresol, o-, m-, and p-monoalkylphenols with alkyl radicals up to 18 carbon atoms, in the presence of a urethanealdehyde resin UA prepared by condensation of an aldehyde A1 and an alkyl urethane U, wherein the aldehyde A1 is selected from the group consisting of formaldehyde, acetaldehyde, propionic aldehyde, butyric aldehyde, and isobutyric aldehyde, and the alkyl urethane U is selected from the group consisting of ethyl urethane, butyl urethane, 2-ethylhexyl urethane, and decyl urethane.

8. A vulcanisable rubber blend containing at least one rubber, reinforcing agents which are reinforcing fibres or filaments or wires, vulcanising agents, curing agents, fillers and additives and the mixture of a urethane aldehyde resin UA and a novolak PA as claimed in claim 1.

9. The vulcanisable rubber blend of claim 8, wherein the mass fraction of the said mixture of a urethane aldehyde resin UA and a novolak PA in the vulcanisable rubber blend is up to 20%, based on the mass of the vulcanisable rubber blend.

10. A vulcanisable rubber blend containing at least one rubber, reinforcing agents which are reinforcing fibres or filaments or wires, vulcanising agents, curing agents, fillers and additives and a mixture of a urethane aldehyde resin UA and a novolak PA, wherein the novolak PA is prepared by the process of claim 7.

11. The vulcanisable rubber blend of claim 10, wherein the mass fraction of the said mixture of a urethane aldehyde resin UA and a novolak PA in the vulcanisable rubber blend is up to 20%, based on the mass of the vulcanisable rubber blend.

* * * * *